Figure 1:
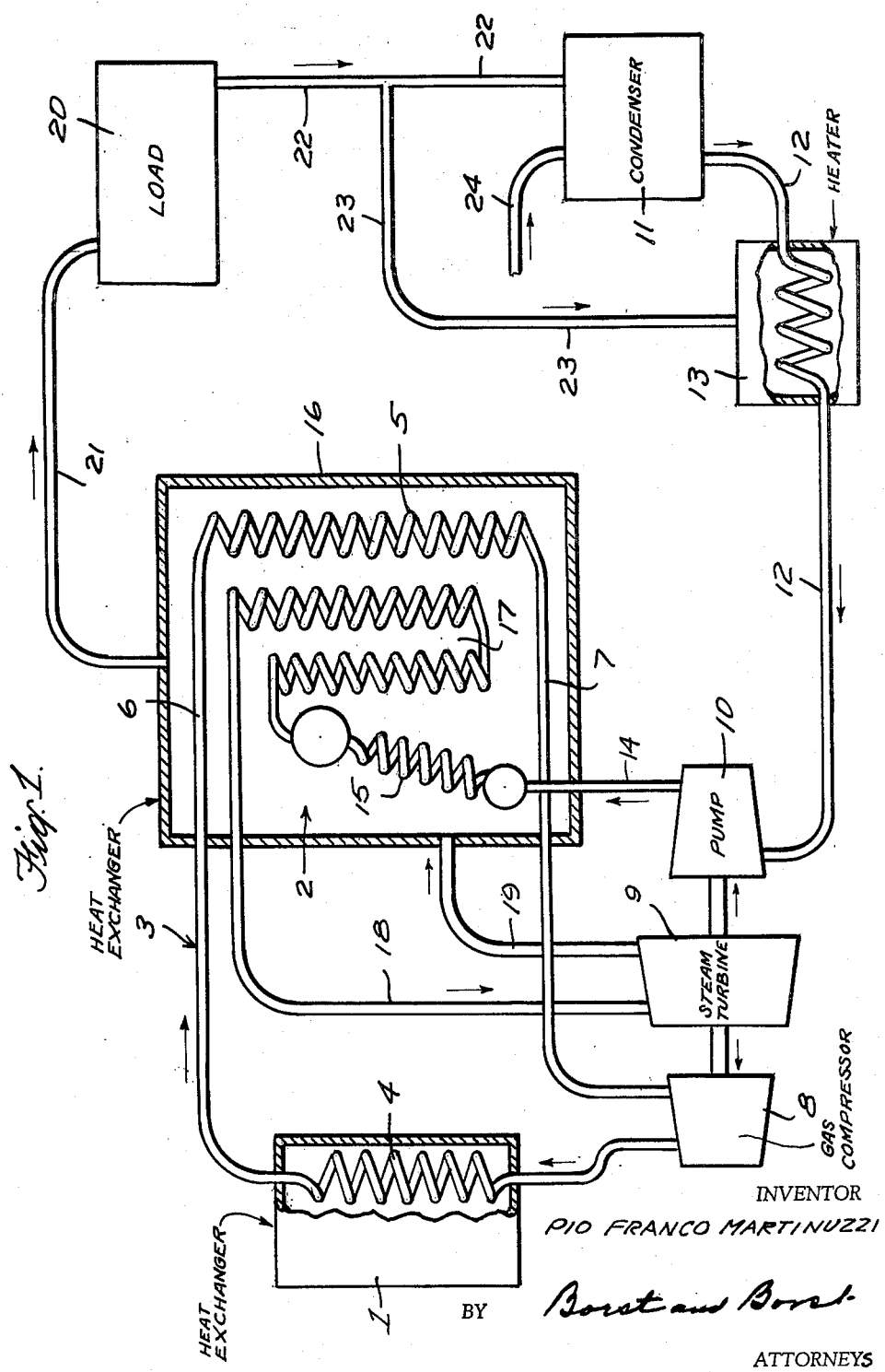

Oct. 29, 1963  P. F. MARTINUZZI  3,108,575
CIRCULATION SYSTEM FOR GAS-STEAM POWER CYCLES
Filed June 20, 1960  3 Sheets-Sheet 1

INVENTOR
PIO FRANCO MARTINUZZI
BY Borst and Borst
ATTORNEYS

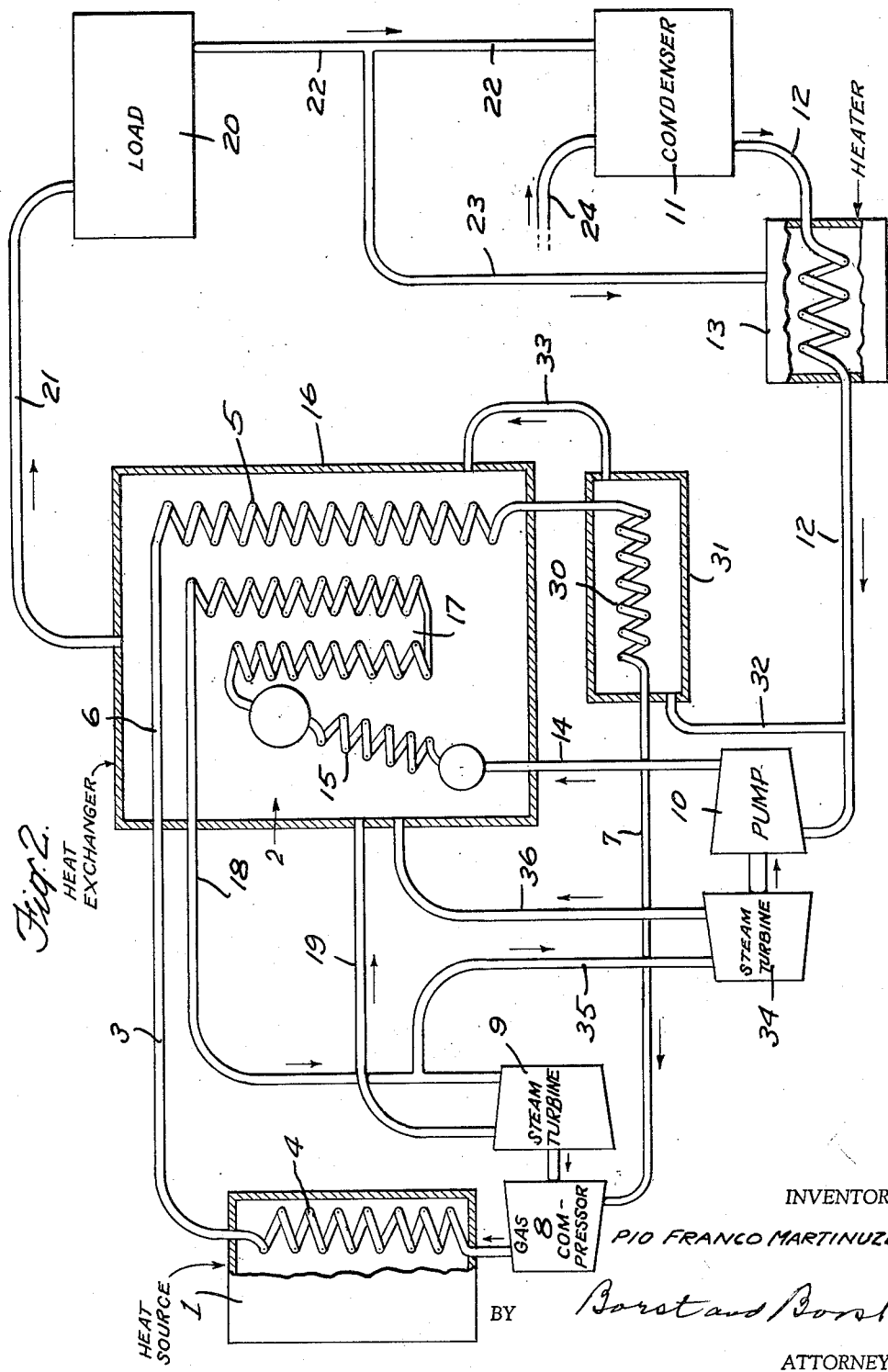

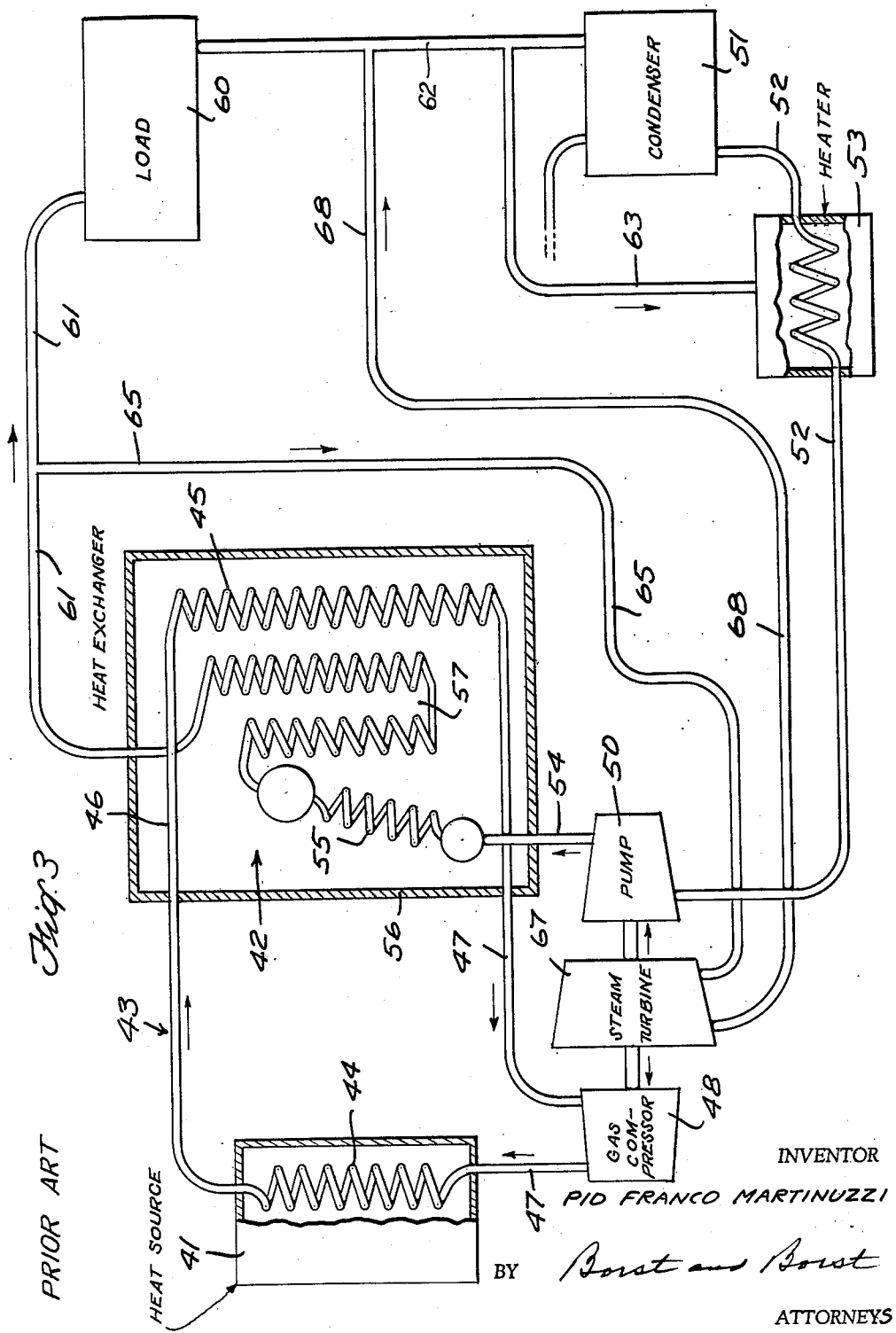

United States Patent Office 3,108,575
Patented Oct. 29, 1963

3,108,575
CIRCULATION SYSTEM FOR GAS-STEAM POWER CYCLES
Pio Franco Martinuzzi, Hoboken, N.J., assignor to Sperry Rand Corporation, Ford Instrument Company Division, Wilmington, Del., a corporation of Delaware
Filed June 20, 1960, Ser. No. 37,439
14 Claims. (Cl. 122—1)

This invention relates to power plants of the gas-steam power cycle type in which a gas is constantly circulated under high pressure in a closed circuit running through a heat source and a steam generator for producing wet or superheated steam at a pressure suitable for power, heating, or industrial process purposes. In the following specification, for descriptive purposes only, it will be assumed that superheated steam is generated for power purposes, it being understood that the invention is not limited thereto. In power plants of this type, the gas, which is circulated through the closed circuit by a suitable compressor, absorbs heat from and thereby cools the heat source, and gives off heat in the generator, thereby heating the generator and producing steam. The amount of gas circulated per hour, the temperature to which it is raised by the heat source, the amount of heat lost in the generator and the temperature and the amount and pressure of the steam produced by the generator are all dependent on the steam requirements of the system. The power absorbed by the compressor in circulating the gas through the closed circuit at the required rate for a known heat output of the source depends on the length, cross section area, surface roughness of the pipes and passages through which the gas is circulated, and the velocity of the gas circulated.

As far as applicant is aware, in prior steam power plants of this type the gas circulating compressor is driven by an electric motor which is supplied by current from an electric generator which may be driven by a steam turbine which in turn is supplied by steam generated by the steam generator. In some systems the compressor is preferably driven directly by the steam turbine, thereby eliminating the electric motor and generator. The feed water is forced through a coiled conduit evaporator, from which it emerges in the form of steam, part of which is used to drive the fluid compressor and the balance of which is applied to the load. In prior systems of this type the heat source is generally, but not necessarily, a gas-cooled nuclear reactor.

In gas-cooled reactor circuits of the aforesaid type, the power absorbed by the compressor in circulating the gas is a percentage of the power (heat) given out by the reactor, which in present day plants varies between 5% and 15%. It will therefore be seen that there is a very considerable power or heat loss in driving the compressor, which is due to the fact that the power absorbed by the compressor drive is mechanical power, whereas the work imparted to the gas circuit by the compressor is in heat form, which cannot be completely converted back into mechanical work. Each kilowatt given back to the gas by the compressor can only generate about a quarter of a kilowatt in the generator. The balance of the power required to drive the compressor must therefore be provided by fresh reactor heat.

But if the compressor is driven by a steam turbine in such a manner that the steam exhausting from the turbine re-enters the steam circuit feed system instead of going to a condenser or other heat sink substantially if not all of the heat losses of the compressor drive can be recovered.

It is therefore the principal object of the invention to provide a steam generating system of the gas-steam power cycle type in which the loss of heat due to the driving of the gas circulating compressor is substantially, if not completely eliminated.

Another object of the invention is to provide a system of the aforesaid character which is of relatively simple construction and is very efficient in operation.

Still another object of the invention is to provide a system of the aforesaid character which is so constructed and arranged that it is impossible for steam to enter the gas coolant reactor circuit in the event of breakage or leakage of any of the tubes or conduits.

In accordance therewith the system of the invention comprises generally a heat source and a heat exchanger. A closed circuit, which runs through the heat source and the evaporator, is adapted to have a coolant gas constantly circulated therethrough by a circulating compressor which is driven by a steam turbine. The closed circuit includes a pair of heat transfer elements one of which is disposed within the heat source and the other of which is disposed within the heat exchanger. The heat transfer elements may be any one of the various different heat types of transfer elements which are presently used in power plants. The coolant gas absorbs heat from the heat source and dissipates this heat in the heat exchanger as it is circulated. An evaporator and a superheating element, both of which are of known types and operate in the usual manner, are also disposed within the heat exchanger. Feed water, preferably preheated, which consists of the condensed exhaust steam from the load plus any make up water which might be needed, is constantly ejected into the evaporator by a high pressure feed pump which may also be driven by the compressor driving turbine or by a separate turbine. In the evaporator the feed water is converted into steam which is forced by its own power through the superheater, if used, and into the compressor driving turbine. The steam exhausted from the compressor driving turbine, which is at a pressure slightly higher than the normal steam pressure within the heat exchanger, is delivered to the heat exchanger where it is reheated to the condition required by the system.

Having stated the principal objects of the invention, other and more limited objects thereof will be apparent from the following specification and the accompanying drawings forming a part thereof in which the presently preferred embodiment of the invention is shown and described.

In the drawing:

FIG. 1 is a diagrammatic view of a gas-steam power cycle steam generating system constructed in accordance with the invention, and in which all of the feed water is raised to high pressure, and converted into steam and sent through the compressor and pump driving turbine and exhausted into the heat exchanger where it is re-heated to the condition required by the system;

FIG. 2 is a diagrammatic view of a slightly modified system in which a pair of turbines are provided, one for driving the gas circulating compressor and one for driving the feed water pump, and in which only a portion of the feed water is raised to high pressure and converted into steam at high pressure and delivered to the two turbines and exhausted into the heat exchanger; and FIG. 3 is a diagrammatic view schematically illustrating the general type of gas-steam power cycle steam generating system presently used, which view is included herewith for purposes of comparison in order to more clearly point out the differences and advantages of applicant's system over presently known systems.

The invention will now be described in detail in connection with the drawing with the use of reference characters, reference being had first to FIG. 1 of the drawings. As shown therein the system comprises a source of heat 1 and a superheating heat exchanging steam generator generally indicated by the numeral 2. A closed gas circulating circuit, generally indicated by the numeral 3, and which runs through the heat source 1 and the heat exchanger 2, includes a heat exchanging element 4, which is diagrammatically shown herein for purposes of illustration as a tubular coil which is disposed in the heat source 1 and a similar heat exchanging element 5 which is disposed within the casing 16 of the heat exchanger 2. The upper ends of the coils 4 and 5 are connected together by an upper tubular conduit 6, and the lower ends thereof are connected together by a lower tubular conduit 7 thus providing the closed circuit 3. During operation fluid under high pressure is constantly circulated in the closed circuit 3, first through the coil 4 in the heat source 1 and then through the coil 5 in the generator 2, by a circulating gas compressor 8 which is interposed in the lower conduit 7 and is driven by a steam turbine 9. As the fluid passes through the coil 4 it absorbs heat from the heat source 1, and as it passes through coil 5 it gives off heat, thereby superheating the steam which is injected into the generator casing 2 as will be hereinafter described.

In the system, as shown and described herein, the heat source 1 is asumed to be a nuclear reactor, and the fluid that is circulated in the closed circuit 3 is assumed to be helium gas. But it is to be understood that the system of the invention is not restricted to these elements, as any heat source which is capable of providing the required heat may be substituted for the nuclear reactor, and any fluid which is capable of quickly absorbing and dissipating heat may be used in place of the helium gas. A conventional fuel fired heat generator may be used, if desired. Also in chemical plants certain chemical reactions generate a large amount of heat which could be used as the heat source. In high temperature systems helium gas is preferably used, but in some lower temperature systems carbon dioxide gas ($CO_2$) may be used equally well; and in some other systems any gas or gas liquid combination which is capable of quickly absorbing and dissipating heat may be used.

The steam turbine 9 also drives a high pressure feed water pump 10 by which the feed water is supplied to the steam generator 2. The feed water is withdrawn from a condenser 11 through a conduit 12, which passes through a feed water heater 13 by which the feed water is preheated, and into the pump 10 which discharges the feed water under high pressure through a conduit 14 and into an evaporator 15 disposed within the casing 16 of the heat exchanger 2. In the evaporator 15 the feed water is converted into steam which is supplied under high pressure to the steam turbine 9 through a superheating element 17, diagrammatically shown herein as a tubular coil, and a tubular conduit 18. The exhaust steam from the turbine 9 is discharged through a conduit 19 and into the casing 16 at a slightly higher pressure than the normal pressure maintained in the casing 16, which is the pressure required by the load. In the casing 16 the discharged steam is reheated to the required temperature and pressure and is supplied to the load 20 through a conduit 21. The exhaust steam from the load 20 is discharged through a conduit 22 into the condenser 11 where it is condensed into feed water and through a branch conduit 23 into the feed water heater 13 thereby preheating the feed water. Fresh feed water, over and above that provided by the condenser 11, if any is required, is supplied from a suitable source through a conduit 24.

The slightly modified form of the invention shown in FIG. 2 will now be described. Basically the fundamental features of the two forms of the invention as shown in FIGS. 1 and 2 respectively are the same, there being only slight differences in the specific construction and operation of the two forms. Both forms of the invention comprise a heat source, a heat exchanging steam generator, a closed gas circulating circuit which runs through the heat source and the generator through which fluid is constantly circulated by a circulating gas compressor which is driven by steam turbine means, a high pressure feed water pump which is also driven by the steam turbine means and by which feed water is forced under high pressure into an evaporator disposed within the steam generator casing where it is converted into steam which is then superheated and delivered to the steam turbine, and the exhaust steam from the steam turbine means discharges into the generator casing. In the form of the invention shown in FIG. 1 all of the feed water is forced through the evaporator, converted into steam and then delivered through the superheater to the steam turbine means, and only a single steam turbine is provided for driving both the circulating gas compressor and the feed water pump. In the form of the invention shown in FIG. 2 only a portion of the feed water is converted into steam, superheated and delivered to the steam turbine means and exhausted into the generator casing, and in which a pair of steam turbines are provided, one for driving the circulating gas compressor, and one for driving the feed water pump. Otherwise the construction and operation of the two forms of the invention are the same.

In describing the form of the invention shown in FIG. 2 only the differences between the form shown in FIG. 2 and that shown in FIG. 1 will be described and the same references will be applied to like parts in the two figures. As shown in FIG. 2 the lower conduit 7 which connects the lower ends of the coils 4 and 5 has a heat dissipating coil 30 interposed therein which is disposed in an auxiliary evaporator 31. That portion of the feed water which is not forced into the main evaporator, converted into steam, superheated and delivered to the gas circulating compressor driving turbine 9, is delivered through a branch conduit 32 into the evaporator 31 in which it is converted into steam and discharged into the generator casing 16 through a connecting conduit 33. The high pressure feed water pump 10 is driven by a separate steam turbine 34 which is supplied with steam from the conduit 18 through a branch conduit 35, and the exhaust steam from the turbine 34 is discharged into the heat exchanger casing 16 through a conduit 36. Obviously the turbine 9 could also be used to drive the feed water pump 10 as is done in the system shown in FIG. 1, in which case the turbine 34 and the conduits 35 and 36 could be eliminated.

The system shown in FIG. 3, which is representative of the systems of this type, which are presently in use, will now be described. As shown in FIG. 3 the system comprises a nuclear reactor 41 and a heat exchanging superheating generator 42. A closed gas circulating circuit, generally indicated by the numeral 43, and which runs through the reactor 41 and the heat exchanger 42, includes a heat exchanging element 44 which is disposed in the reactor 41, and a heat exchanging element 45 which is disposed in the heat exchanger 42. The upper ends of the elements 44 and 45 are connected together by an upper tubular conduit 46, and the lower ends thereof are connected together by a lower tubular conduit 47, thus providing the closed circuit 43. During operation helium gas under high pressure is constantly circulated in the closed circuit 43, passing first through the element 44 in the reactor 41 and then through the element 45 in the generator 42, by a circulating gas compressor 48 which is interposed in the lower conduit 47. As the helium gas passes through the element 44 it absorbs heat from the reactor 41 thereby cooling the reactor 41, and as it passes through the element 45 it gives off heat thereby heating the generator 42 to a high temperature and pressure.

The feed water is supplied to the generator, by a feed water pump 50, from a steam condenser 51, through a conduit 52 which passes through a feed water heater 53 by which the feed water is preheated. The feed water pump 50 forces the preheated feed water, under high pressure, through a conduit 54 and into an evaporator 55, disposed within the casing 56 of the steam generator 42, where it is converted into steam. The steam then passes through a superheating coil 57 and out to the load 60 through a conduit 61. The exhaust steam from the load 60 is discharged through a conduit 62 into the condenser 51, where it is condensed into feed water, and through a branch conduit 63 into the feed water heater 53 thereby preheating the feed water.

The gas circulating compressor 48 and the feed water pump 50 are driven by a steam turbine 67 which is supplied with steam from the conduit 61 through a conduit 65. The exhaust from the turbine 67 is discharged into the conduit 62 through a conduit 68.

The circulation efficiency for a specific system of the presently used type of system shown in FIG. 3 will now be considered, it being assumed that 70 lbs./sec. of helium are circulated through the closed circuit 43 between the nuclear reactor 41 and the steam generator 42, that the helium leaves the heat exchanger 42 and enters the gas circulating compressor 48 at 415° F. and 646 p.s.i.a., leaves the compressor 48 at 439° F. and 682 p.s.i.a., enters the reactor 41, and leaves the reactor 41 at 1000° F. and enters the heat interchanger steam generator 42, that the heat capacity of the reactor 41 is 49100 B.t.u./sec., that the heat supplied to the circulating gas by the compressor 48 is 2100 B.t.u./sec., and that the heat utilized in driving the turbine 67 by which the gas circulating compressor 48 and feed water pump 50 are driven is 8640 B.t.u./sec. The total B.t.u./sec. supplied to the heat exchanging generator are 49100 B.t.u./sec. by the reactor 41 plus 2100 B.t.u./sec. supplied to the circulating helium by the compressor 48. Therefore a total of 51200 B.t.u./sec. are supplied to the heat interchanging generator 42. Of this 8460 B.t.u./sec. are utilized in driving the compressor 48 for circulating the helium gas through the closed circuit 43. That leaves a net output of 42560 B.t.u./sec. from the heat exchanging generator 42. The circulating efficiency of the system is therefore 42560 B.t.u./sec., the net output of the heat interchanger generator, divided by the 49100 B.t.u./sec., the output of the reactor 41, which equals 86.6%. There is therefore a loss of 13.4% of the heat generated by the reactor 41 which is utilized in driving the gas circulating compressor 48 and the feed water pump 50 by the steam turbine 67.

The operation of the system shown in FIG. 1 will now be specifically described, it being assumed that the steam output of the heat exchanger 2 is 29 lbs./sec. at 600 p.s.i.a. and 850° F., that the heat capacity of the reactor is 34,400 k.w., and that 69.8 pounds of helium are circulated per second through the closed circuit 3. The helium leaves the element 4 of the heat source 1 and enters the element 5 in the heat exchanger 2 at 930° F. It leaves the element 5 and enters the gas circulating compressor 8 at 540° F. and 650 p.s.i.a. The compressor 8 raises the pressure of the helium to 674 p.s.i.a. and returns it to the element 4 in the reactor 1, and in so doing raises the temperature thereof from 540° F. to 557° F.

For 29 lbs./sec. of steam, 29 lbs./sec. of feed water will be required. In this system, as shown in FIG. 1, the feed water pump 10 forces the entire amount of feed water required, which is preheated to 328° F. by the feed water heater 13, into the evaporator 15 under 1520 p.s.i.a. pressure and 328° F. where it is converted into steam. The steam is then superheated in the superheating coil 17 and delivered at 1485 p.s.i.a. and 700° F. through the conduit 18 to the steam turbine 9 which drives both the compressor 8 and the pump 10. The steam is exhausted from the turbine 9 at 615 p.s.i.a. and 522° F. and delivered into the casing 16 of the generator 2 where it is superheated to 850° F. at 600 p.s.i.a. and delivered to the load 20 through the conduit 21.

The number of B.t.u./sec. generated by the reactor 1 is 32,600, and the number of B.t.u./sec. produced in the compressor 8 and imparted to the helium is 1515. The number of B.t.u./sec. imparted to the steam generator 2 is therefore 34,115. The number of B.t.u./sec. delivered to the turbine 9 through the conduit 18 is 37,330, the number of B.t.u./sec. returned to the heat exchanger casing 16 from the turbine 9 is 35,650. The compressor drive heat is therefore 1680. The net generator heat for application to the load is therefore 34,115. The circulation efficiency of the system is therefore $$\frac{34,115-1680}{32,600}=\frac{32,435}{32,600}=99.4\%$$

This means a loss of only 0.6% for driving both the compressor and the feed water pump.

The operation of the system shown in FIG. 2 will now be specifically described, it being assumed that the output capacity thereof, the heat capacity of the reactor, and pounds of helium circulated per hour are the same as those described in connection with FIG. 1, i.e. 32,635 B.t.u./sec., 29 lbs./sec. and 69.8 lbs./sec. The helium leaves the element 4 in the reactor 1 and enters the element 5 in the steam generator 2 at 930° F. It leaves the element 5 and enters the coil 30 in the auxiliary evaporator 31 at 660° F., and leaves the coil 30 and enters the circulating compressor at 504° F. and 650 p.s.i.a. The compressor raises the pressure of the helium to 677 p.s.i.a. and the temperature thereof to 523° F.

In this form of the invention only 18 lbs./sec. of the 29 lbs./sec. of feed water required, which is preheated to 328° F. by the feed water heater 13, is forced by the feed water pump 10 into the evaporator 15 and superheating coil 17. The remaining 11 lbs./sec. is fed directly into the casing 16 of the heat exchanger 2 through the auxiliary evaporator 30 where it is converted into steam at 622 p.s.i.a. The steam leaves the superheater 17 at 2500 p.s.i.a. and 800° F. Of the 18 lbs./sec. delivered 16.16 lbs./sec. are fed to the turbine 9 which drives the gas circulating compressor 8, and the remaining 1.84 lbs./sec. are fed to the turbine 34 which drives the feed water pump 10. The steam from the turbine 9 is exhausted into the casing 16 at 655 p.s.i.a. and 500° F.; and the steam from the turbine 34 is exhausted into the casing 16 at 655 p.s.i.a. and 506° F. All of the steam delivered to the generator casing 16 is superheated to 850° F. at 600 p.s.i.a. and delivered to the load 20 through the conduit 21.

The number of B.t.u./sec. generated by the reactor 1 is 32,635, and the number of B.t.u./sec. produced in the compressor 8 and imparted to the helium is 1515. The number of B.t.u./sec. delivered to the heat exchanger 2 is therefore 34,150. The number of B.t.u./sec. delivered to the compressor driving turbine 9 is 21,080 and the number of B.t.u./sec. returned to the casing 16 from the turbine 9 is 19,510. The compressor drive heat is therefore 1570. The number of B.t.u./sec. delivered to the pump driving turbine 34 is 2403, and the number of B.t.u./sec. returned to the generator casing 16 from the turbine 34 is 2230. The pump drive heat is therefore 173. The net generator heat for application to the load is therefore 34,150−(1570+173)=32,407. The circulation efficiency of the system is therefore $$\frac{32,407}{32,635}=99.3\%$$

which means a loss of only 0.7% for driving both the compressor and the fuel pump.

From the foregoing it will be apparent to those skilled in this art that I have provided a very novel, simple, and efficient system for accomplishing the objects of the invention, and it is to be understood that I am not limited to the specific construction and arrangement shown and described herein as various modifications may be made therein within the spirit of the invention and the scope of the appended claims.

What is claimed is:

1. A steam generating system of the character described comprising a heat source, a gas tight casing defining a high pressure heat exchanging chamber, an endless tubular fluid filled circuit which extends through said heat source and said chamber, a pair of heat exchanging coils interposed in said endless tubular circuit one of which is disposed within said heat source and the other of which is disposed within said heat exchanging chamber, a circulating compressor disposed in said circuit by which fluid is constantly circulated through said circuit whereby heat is absorbed by said fluid while passing through said heat source and given off by said fluid while passing through said chamber, an evaporator in said chamber, a source of feed water, a feed water pump connected between said source of feed water and said evaporator by which feed water is constantly forced under high pressure into said evaporator where said feed water is converted into steam, steam turbine means connected to said feed water pump and said circulating compressor by which said circulating compressor and said feed water pump are driven, a superheating element disposed in said chamber and connected to the output of said evaporator into which the steam generated in said evaporator is delivered, conduit means connected to said superheating element and said steam turbine means by which steam under high pressure and temperature is delivered from said superheating element to said steam turbine means, other conduit means by which steam is exhausted from said steam turbine means into said chamber, and a discharge conduit means adapted to deliver steam from said chamber to a load.

2. A steam generating system of the character described comprising a heat source, a gas tight casing defining a high pressure heat exchanging chamber, an endless tubular fluid filled circuit which extends through said heat source and said chamber, a pair of heat exchanging coils interposed in said endless tubular circuit one of which is disposed within said heat source and the other of which is disposed within said heat exchanging chamber, a circulating compressor disposed in said circuit by which fluid is constantly circulated through said circuit whereby heat is absorbed by said fluid while passing through said heat source and given off by said fluid while passing through said chamber, an evaporator in said chamber, a source of feed water, a feed water pump connected between said source of feed water and said evaporator by which feed water is constantly forced under high pressure into said evaporator where said feed water is converted into steam, a steam turbine connected to said circulating compressor by which said circulating compressor and said feed water pump are driven, a superheating element disposed in said chamber and connected to the output of said evaporator into which the steam generated in said evaporator is delivered, a conduit connected to said superheating element and said steam turbine by which steam under high pressure and temperature is delivered from said superheating element to said steam turbine, an exhaust conduit means by which steam is exhausted from said steam turbine into said chamber, and a discharge conduit adapted to deliver steam from said chamber to a load.

3. A steam generating system of the character described comprising a heat source, a gas tight casing defining a high pressure heat exchanging chamber, an endless tubular fluid filled circuit which extends through said heat source and said chamber, a pair of heat exchanging coils interposed in said endless tubular circuit one of which is disposed within said heat source and the other of which is disposed within said heat exchanging chamber, a circulating compressor disposed in said circuit by which fluid is constantly circulated through said circuit whereby heat is absorbed by said fluid while passing through said heat source and given off by said fluid while passing through said chamber, a steam turbine connected by said circulating compressor by which said circulating compressor is driven, an evaporator in said chamber, a source of feed water, a feed water pump connected between said source of feed water and said evaporator by which feed water is constantly forced under high pressure into said evaporator where said feed water is converted into steam, another steam turbine connected to said feed water pump by which said feed water pump is driven, a superheating coil disposed in said chamber and connected to the said output of evaporator into which the steam generated in said evaporator is delivered, tubular conduit means connected to said superheating coil and said steam turbines by which steam under high pressure and temperature is delivered from said superheating coil to said steam turbines, other conduit means by which steam is exhausted from said steam turbines into said chamber, and a discharge conduit adapted to deliver steam from said chamber to a load.

4. A steam generating system as defined by claim 1 in which only a portion of the required feed water is pumped into said evaporator where it is converted into steam and delivered into said chamber after being utilized to drive said steam turbine means, and in which other means are provided by which the balance of the required feed water is converted into steam and delivered into said chamber.

5. A steam generating system as defined by claim 4 in which said other means comprises an auxiliary evaporator through which said endless fluid filled circuit also extends.

6. A steam generating system as defined by claim 3 in which only a portion of the feed water is pumped into said evaporator where it is converted into steam and delivered into said chamber after being utilized to drive said steam turbine means, and in which other means are provided by which the balance of the required feed water is converted into steam and delivered into said chamber.

7. A steam generating system as defined by claim 6 in which said other means comprises an auxiliary evaporator through which said endless fluid filled circuit also extends.

8. A steam generating system of the character described comprising a heat source, a gas tight casing defining a high pressure heat exchanging chamber, an endless tubular fluid filled circuit which extends through said heat source and said chamber, a pair of heat exchanging coils interposed in said endless tubular circuit one of which is disposed within said heat source and the other of which is disposed within said heat exchanging chamber, a circulating compressor disposed in said circuit by which fluid is constantly circulated through said circuit whereby heat is absorbed by said fluid while passing through said heat source and given off by said fluid while passing through said chamber, an evaporator in said chamber, a source of feed water, a feed water pump connected between said source of feed water and said evaporator by which feed water is constantly forced under high pressure into said evaporator where said feed water is converted into steam, steam turbine connected to said circulating compressor and said feed water pump means by which said circulating compressor and said feed water pump are driven, tubular conduit means by which steam generated in said evaporator is delivered to said steam turbine means, other conduit means by which steam is exhausted from said steam turbine means into said chamber, and discharge conduit means adapted to deliver steam from said chamber to a load.

9. A steam generating system of the character described comprising a heat source, a gas tight casing defining a high pressure heat exchanging chamber, an endless tubular fluid filled circuit which extends through said heat source and said chamber, a pair of heat exchanging coils interposed in said endless tubular circuit one of which is disposed within said heat source and the other of which is disposed within said heat exchanging chamber, a circulating compressor disposed in said circuit by which fluid is constantly circulated through said circuit whereby heat is absorbed by said fluid while passing through said heat source and given off by said fluid while passing through said chamber, an evaporator in said chamber, a source of feed water, a feed water pump connected between said source of feed water and said evaporator by which feed water is constantly forced under high pressure into said evaporator where said feed water is converted into steam, a steam turbine connected to said circulating compressor and said feed water pump by which said circulating compressor and said feed water pump are driven, tubular conduit means by which steam generated in said evaporator is delivered to said steam turbine, an exhaust conduit means by which steam is exhausted from said steam turbine into said chamber, and a discharge conduit adapted to deliver steam from said chamber to a load.

10. A steam generating system of the character described comprising a heat source, a gas tight casing defining a high pressure heat exchanging chamber, an endless tubular fluid filled circuit which extends through said heat source and said chamber, a pair of heat exchanging coils interposed in said endless tubular circuit one of which is disposed within said heat source and the other of which is disposed within said heat exchanging chamber, a circulating compressor disposed in said circuit by which fluid is constantly circulated through said circuit whereby heat is absorbed by said fluid while passing through said heat source and given off by said fluid while passing through said chamber, a steam turbine connected to said circulating compressor by which said circulating compressor is driven, an evaporator in said chamber, a source of feed water, a feed water pump connected between said source of feed water and said evaporator by which feed water is constantly forced under high pressure into said evaporator where said feed water is converted into steam, another steam turbine connected to said feed water pump by which said feed water pump is driven, tubular conduit means by which steam generated in said evaporator is delivered to said steam turbines, other conduit means by which steam is exhausted from said steam turbines into said chamber, and a discharge conduit adapted to deliver steam from said chamber to a load.

11. A steam generating system as defined by claim 8 in which only a portion of the required feed water is pumped into said evaporator where it is converted into steam and delivered into said chamber after being utilized to drive said steam turbine means, and in which other means are provided by which the balance of the required feed water is converted into steam and delivered into said chamber.

12. A steam generating system as defined by claim 11 in which said other means comprises an auxiliary evaporator through which said endless fluid filled circuit also extends.

13. A steam generating system as defined by claim 11 in which only a portion of the feed water is pumped into said evaporator where it is converted into steam and delivered into said chamber after being utilized to drive said steam turbine means, and in which other means are provided by which the balance of the required feed water is converted into steam and delivered into said chamber.

14. A steam generating system as defined by claim 13 in which said other means comprises an auxiliary evaporator through which said endless fluid filled circuit also extends.

References Cited in the file of this patent

UNITED STATES PATENTS

| | | |
|---|---|---|
| 1,093,145 | Pagel | Apr. 14, 1914 |
| 1,784,426 | Gleichmann | Dec. 9, 1930 |
| 1,917,166 | Trede et al. | July 4, 1933 |

FOREIGN PATENTS

| | | |
|---|---|---|
| 790,703 | Great Britain | Feb. 12, 1958 |
| 797,725 | Great Britain | July 9, 1958 |
| 806,589 | Great Britain | Dec. 31, 1958 |